(12) United States Patent
Maeda et al.

(10) Patent No.: US 9,972,870 B2
(45) Date of Patent: May 15, 2018

(54) BATTERY MODULE

(71) Applicant: KABUSHIKI KAISHA TOYOTA JIDOSHOKKI, Aichi-ken (JP)

(72) Inventors: Kazuki Maeda, Kariya (JP); Takayuki Kato, Kariya (JP); Hiromi Ueda, Kariya (JP); Hidefumi Oishi, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days. days.

(21) Appl. No.: 15/505,843

(22) PCT Filed: Aug. 19, 2015

(86) PCT No.: PCT/JP2015/073178
§ 371 (c)(1),
(2) Date: Feb. 22, 2017

(87) PCT Pub. No.: WO2016/031635
PCT Pub. Date: Mar. 3, 2016

(65) Prior Publication Data
US 2018/0053970 A1    Feb. 22, 2018

(30) Foreign Application Priority Data
Aug. 27, 2014 (JP) .................. 2014-172853

(51) Int. Cl.
*H01M 10/44* (2006.01)
*H01M 10/6555* (2014.01)
(Continued)

(52) U.S. Cl.
CPC ......... *H01M 10/44* (2013.01); *H01M 2/1016* (2013.01); *H01M 10/482* (2013.01); *H01M 10/6555* (2015.04); *H01M 2010/4271* (2013.01)

(58) Field of Classification Search
None
See application file for complete search history.

(56) References Cited

U.S. PATENT DOCUMENTS

2011/0262797 A1  10/2011  Kim
2012/0129041 A1   5/2012  Komazawa
(Continued)

FOREIGN PATENT DOCUMENTS

| CN | 102237546 | 11/2011 |
|---|---|---|
| DE | 112015002135 | 3/2017 |

(Continued)

OTHER PUBLICATIONS

International Search Report for International Patent Application No. PCT/JP2015/073178, dated Nov. 24, 2015.
(Continued)

*Primary Examiner* — Tracy Dove
(74) *Attorney, Agent, or Firm* — Greenblum & Bernstein, P.L.C.

(57) ABSTRACT

A battery module includes battery cells arranged side by side, two end plates sandwiching the battery cells, an elastic body, and a cover. The cover includes a first cover member and a second cover member. The battery module includes a cable that electrically connects a first electronic component and a second electronic component to each other. The cable has a bent portion capable of being deformed in accordance with relative movement between the first cover member and the second cover member in the arrangement direction. The cover includes support portions that support the cable to maintain the shape of the bent portion.

8 Claims, 9 Drawing Sheets

(51) Int. Cl.
 *H01M 10/48* (2006.01)
 *H01M 2/10* (2006.01)
 *H01M 10/42* (2006.01)

(56) References Cited

U.S. PATENT DOCUMENTS

| | | |
|---|---|---|
| 2013/0189549 A1 | 7/2013 | Nemoto |
| 2014/0141301 A1 | 5/2014 | Aoki |
| 2014/0302363 A1 | 10/2014 | Miyawaki et al. |
| 2015/0263394 A1 | 9/2015 | Yoshioka |
| 2015/0349306 A1 | 12/2015 | Watanabe et al. |
| 2016/0218337 A1 | 7/2016 | Morisaku et al. |
| 2017/0054116 A1 | 2/2017 | Morisaku et al. |

FOREIGN PATENT DOCUMENTS

| | | |
|---|---|---|
| JP | 2010-170884 | 8/2010 |
| JP | 2012-109152 | 6/2012 |
| JP | 2013-175442 | 9/2013 |
| JP | 2014-203754 | 10/2014 |
| JP | 2015-5361 | 1/2015 |
| JP | 2015-26523 | 2/2015 |
| JP | 2015-106536 | 6/2015 |
| WO | 2013/015235 | 1/2013 |
| WO | 2014/087959 | 6/2014 |
| WO | 2014/119722 | 8/2014 |
| WO | WO2015/033795 | 3/2015 |
| WO | WO2015/170581 | 11/2015 |

OTHER PUBLICATIONS

International Preliminary Report on Patentability for PCT/ JP2015/073178, dated Feb. 28, 2017, along with English-language translation.

Written Opinion of the ISA for International Patent Application No. PCT/JP2015/073178, dated Nov. 24, 2015, along with English-language translation.

Office Action issued in German Counterpart Patent Appl. No. 11 2015 003 893.0, dated Jan. 4, 2018.

BATTERY MODULE

TECHNICAL FIELD

The present invention relates to a battery module that has battery cells arranged side by side.

BACKGROUND ART

A battery cell includes a case that accommodates an electrode assembly and electrolytic solution. The electrode assembly has positive electrodes, negative electrodes, and separators that insulate the positive electrodes and negative electrodes from each other. The electrode assembly has a laminated structure in which each separator is arranged between a positive electrode and the corresponding negative electrode.

A battery module has battery cells arranged side by side. The battery cells are arranged in a direction in which the positive electrodes, the negative electrodes, and the separators are stacked in the electrode assembly, that is, in the lamination direction. The battery module also has two end plates that sandwich the battery cells from the opposite sides in the arrangement direction of the battery cells. Further, as disclosed in, for example, Patent Document 1, a cover is placed on the surfaces of the battery cells on which terminals are located in some cases to prevent adhesion of liquid and dust to the battery cells, and insulate and protect bus bar connecting portions between the terminals of the battery cells.

The battery cells expand through repetitive use. Specifically, repetitive charging and discharging of the battery cells causes the electrode assemblies inside the cases to expand in the lamination direction of the electrode assembly. With the expansion of the electrode assembly in the lamination direction, the side walls located in the lamination direction of the electrode assembly in the case are pushed, which deforms the case. Such expansion of the battery cell may apply load on the two end plates. In this regard, some battery modules are provided with an elastic body held between one of the end plates and a battery cell. According to this configuration, when the battery cells expand through repetitive use, the elastic body is elastically deformed to limit the load applied to the two end plates.

Connecting members of the battery cells are fixed to the cover in some cases. In this case, expansion of the battery cells moves the connecting members in the arrangement direction of the battery cells. However, if the cover cannot be moved in the arrangement direction of the battery cells, stress is applied to the connecting members between the battery cells and the cover, which may damage the connecting members. To cope with such a drawback, the battery module is provided with an attachment plate that is sandwiched between the elastic body and a battery cell and attached to the cover. With this configuration, expansion of the battery cells causes the connecting members, the cover, and the attachment plate to move integrally in the arrangement direction of the battery cells. This limits stress applied to the connecting members between the battery cells and the cover, so that the connecting members are restricted from being broken.

PRIOR ART DOCUMENT

Patent Document

Patent Document 1: Japanese Laid-Open Patent Publication No. 2012-109152

SUMMARY OF THE INVENTION

Problems that the Invention is to Solve

The upper surface of the cover is suitable for mounting electronic components such as a current sensor and a monitoring ECU that controls discharge cutoff when an abnormality occurs in the battery module (the battery cells). The electronic components are electrically connected to each other with cables. In addition, the cover may have a first cover member and a second cover member that are arranged in the arrangement direction of the battery cells. For example, the first cover member is fixed to the connecting members and attached to the attachment plate, and the second cover member is fixed to one of the two end plates. In this manner, the first cover member can be brought into contact with and separated from the second cover member in the arrangement direction of the battery cells in some cases.

For example, it is assumed that a first electronic component, which is one of the electronic components, is fixed to the first cover member, and a second electronic component, which is one of the electronic components, is fixed to the second cover member. The cable that connects the first electronic component and the second electronic component extends to bridge the first cover and the second cover.

When the battery cells expand and the connecting members, the first cover member, and the attachment plate move integrally in the arrangement direction of the battery cells, the first cover member is moved away from the second cover. This makes cable between the first electronic component and the second electronic component taut and thus may break the cable.

The cable may be sufficiently slack so that, even if the first cover member is moved away from the second cover member, the cable will not be taut between the first electronic component and the second electronic component. However, if the cable is excessively slack, the cable tends to flap on the cover, and there is a possibility that the cable contacts surrounding electronic components and broken.

Accordingly, it is an objective of the present invention to provide a battery module that restricts cables from being broken.

Means for Solving the Problems

To achieve the foregoing objective and in accordance with one aspect of the present invention, a battery module is provided that includes a plurality of battery cells, two end plates, an elastic body, a cover, a first electronic component, a second electronic component, and a cable. The battery cells are arranged side by side, each battery cell having a terminal. The two end plates sandwich the battery cells from opposite sides in an arrangement direction of the battery cells. The elastic body is sandwiched between one of the two end plates and one of the battery cells. The elastic body is elastically deformed as the battery cells expand. The cover faces surfaces of the battery cells on which the terminals are provided and includes a first cover member and a second cover member, which are arranged in the arrangement direction of the battery cells and moveable relative to each other in the arrangement direction as the battery cells expand. The first electronic component is fixed to the first cover member. The second electronic component is fixed to the second cover member. The cable electrically connects the first electronic component and the second electronic component to each other. The cable includes a bent portion that is capable of being deformed in accordance with relative movement between the first cover member and the second cover member in the arrangement direction. The cover includes a plurality of support portions that supports the cable to maintain a shape of the bent portion.

MODES FOR CARRYING OUT THE INVENTION

A battery module according to one embodiment will now be described with reference to FIGS. 1 to 11.

Figure 1:
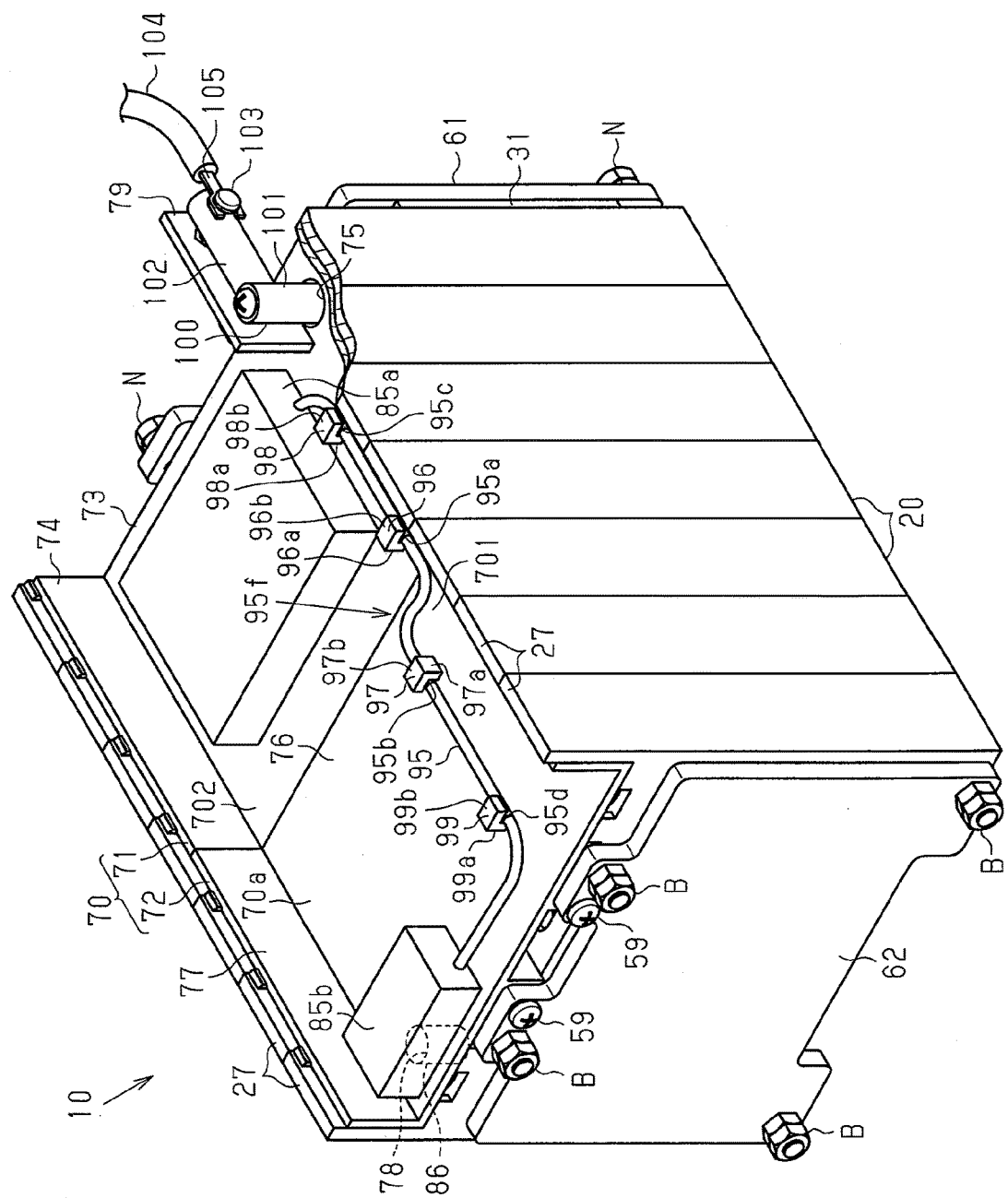
FIG. 1 is a perspective view of a battery module according to one embodiment.
Figure 2:
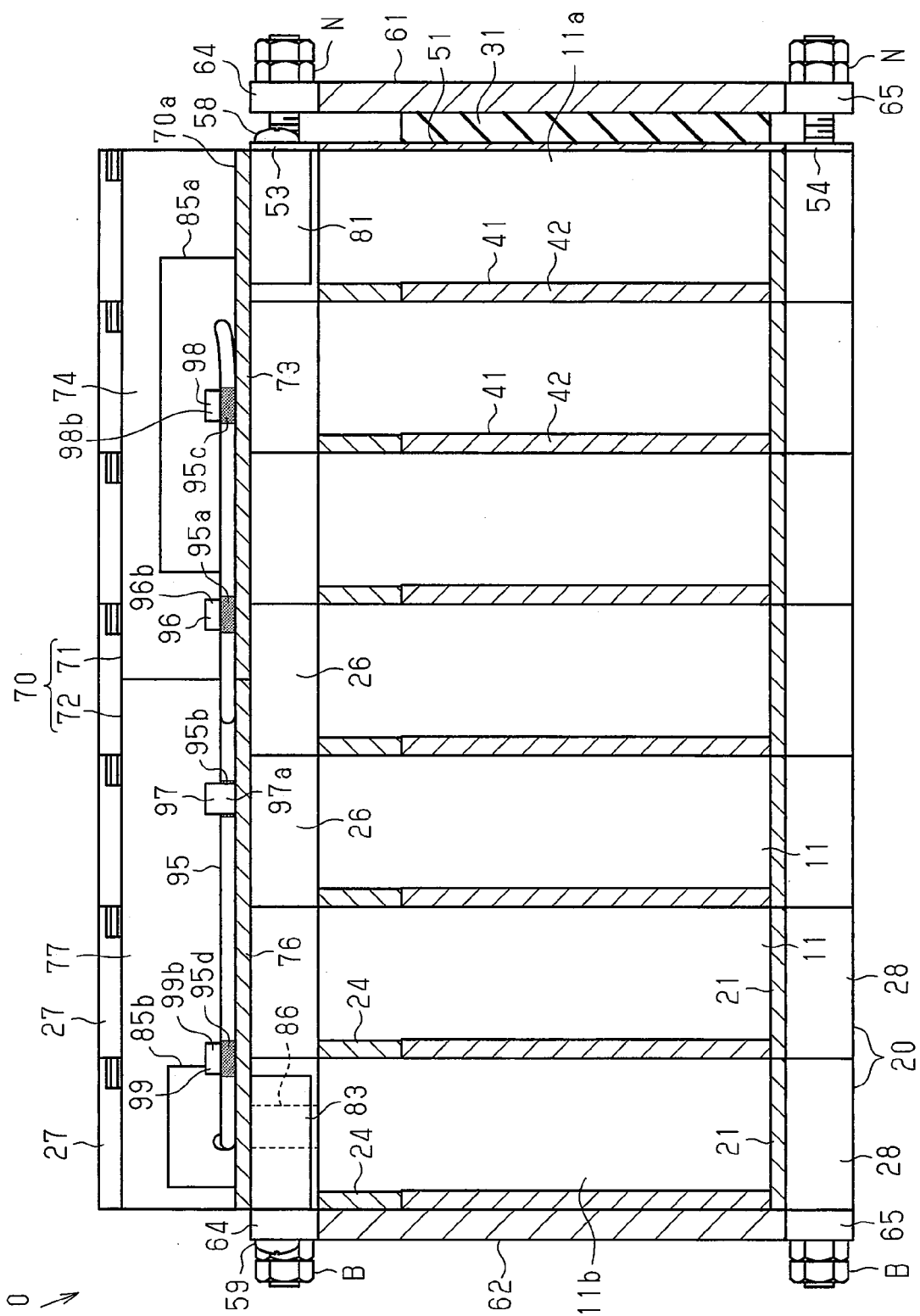
FIG. 2 is a cross-sectional view of the battery module.

As shown in FIGS. 1 and 2, a battery module 10 includes battery cells 11 and heat transfer plates 41. The battery cells 11 and the heat transfer plates 41 are arranged alternately, while being held by battery holders 20. The battery cells 11 and the heat transfer plates 41 are sandwiched between a first end plate 61 and a second end plate 62, which are two end plates provided on the opposite ends in the direction in which the battery cells 11 are arranged. In the following description, one of the battery cells 11 at the opposite ends in the arrangement direction will be referred to as a first battery cell 11a, while the other one will be referred to as a second battery cell 11b. The first battery cell 11a is the battery cell 11 that is adjacent to the first end plate 61, and the second battery cell 11b is the battery cell 11 that is adjacent to the second end plate 62.

Figure 3A:
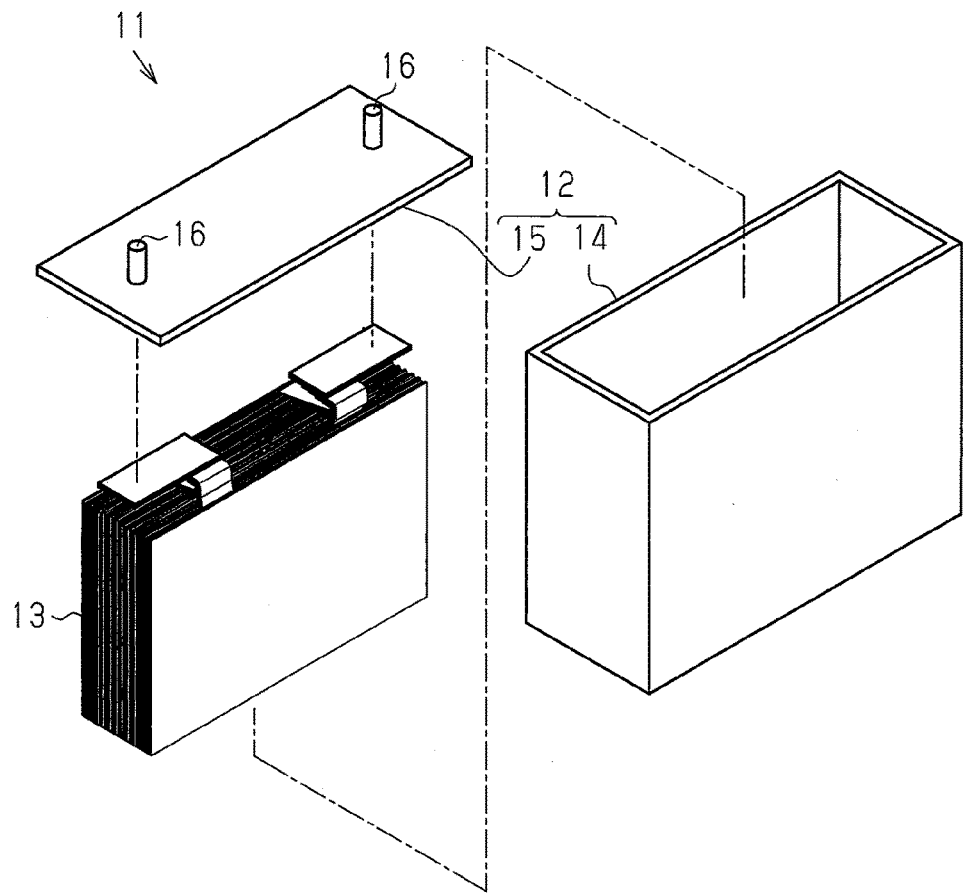
FIG. 3A is an exploded perspective view of a battery cell.

As shown in FIG. 3A, the battery cell 11 has an aluminum case 12 and an electrode assembly 13 accommodated in the case 12. The case 12 includes a case body 14 and a rectangular plate-shaped lid member 15. The case body 14 is shaped as a rectangular tube with a closed end, and the lid member 15 closes the opening of the case body 14. The lid member 15 has terminals 16 (a positive terminal and a negative terminal). Connecting members (not shown) for connecting the battery cells 11 together are connected to the terminals 16.

Figure 3B:
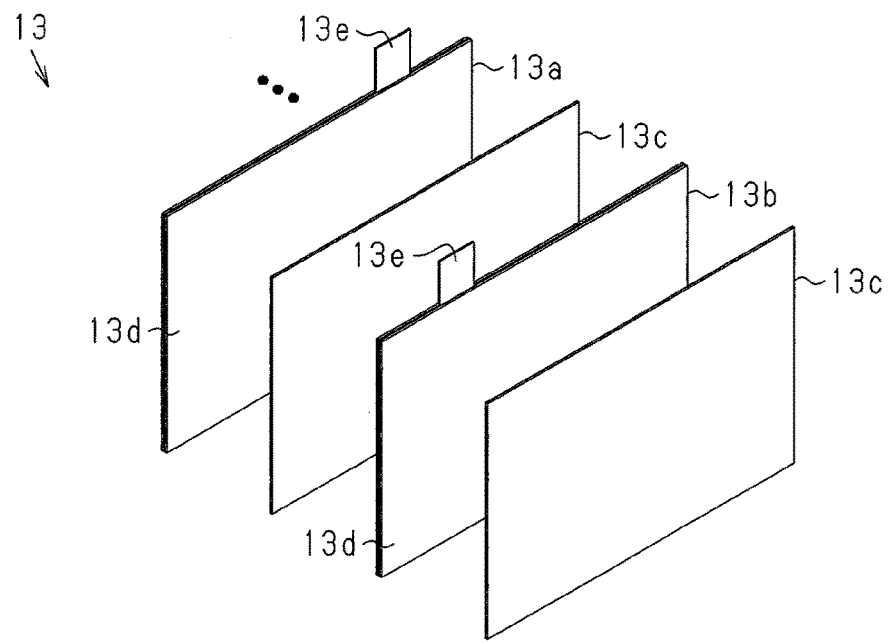
FIG. 3B is an exploded perspective view of the electrode assembly.

As shown in FIG. 3B, the electrode assembly 13 includes positive electrodes 13a, negative electrodes 13b, and separators 13c, each of which is arranged between a positive electrode 13a and a negative electrode 13b. The positive electrodes 13a and the negative electrodes 13b each include an active material layer 13d and a tab 13e. The active material layer 13d is formed by applying an active material to a metal foil, and the tab 13e extends from an end of the metal foil. In the following description, the direction in which the positive electrodes 13a, the negative electrodes 13b, and the separators 13c are stacked will be referred to as a lamination direction.

As shown in FIG. 2, the battery cells 11 are arranged side by side in a direction coinciding with the lamination direction of the electrode assembly 13. A flat plate-shaped elastic body 31 is sandwiched between the first end plate 61 and the first battery cell 11a. The elastic body 31 is made of an elastically deformable material such as rubber or plastic sponge. A flat attachment plate 51 is sandwiched between the elastic body 31 and the first battery cell 11a.

Figure 4:
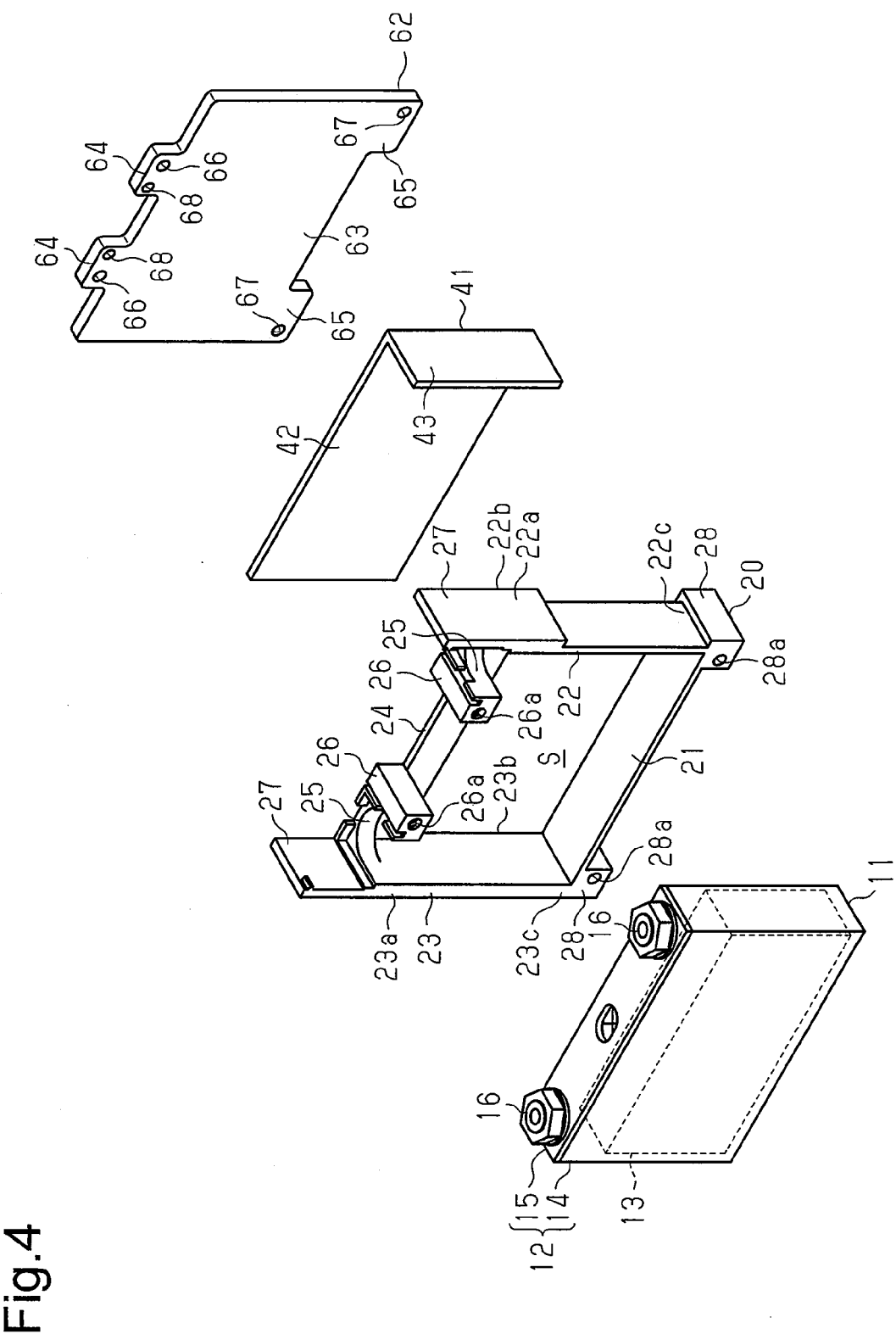
FIG. 4 is an exploded perspective view of the battery module.

As shown in FIG. 4, the battery holder 20 includes a rectangular flat plate-shaped first covering wall 21. The first covering wall 21 has, at the opposite ends in the longitudinal direction, rectangular plate-shaped second and third covering walls 22, 23. The second and third covering walls 22, 23 extend in the thickness direction of the first covering wall 21. The region surrounded by the first covering wall 21, the second covering wall 22, and the third covering wall 23 serves as an accommodating portion S, in which a battery cell 11 is accommodated.

The second covering wall 22 has a first longitudinal end portion 22a and a first transverse end portion 22b. The third covering wall 23 has a first longitudinal end portion 23a and a first transverse end portion 23b. A fourth covering wall 24 extends between parts of the first transverse end portions 22b, 23b that correspond to the first longitudinal end portions 22a, 23a. The first longitudinal end portion 22a of the second covering wall 22 is an end portion opposite to the end portion at which the first covering wall 21 is provided. The first longitudinal end portion 23a of the third covering wall 23 is an end portion opposite to the end portion at which the first covering wall 21 is provided. The thickness direction of the fourth covering wall 24 agrees with the transverse direction of the covering walls 22, 23. The longitudinal direction of the fourth covering wall 24 agrees with the direction in which the second covering wall 22 and the third covering wall 23 are opposed to each other. The direction perpendicular to the thickness direction and the longitudinal direction of the fourth covering wall 24 is the transverse direction of the fourth covering wall 24.

Also, U-shaped terminal accommodating portions 25 are provided at the opposite ends in the longitudinal direction of the fourth covering wall 24. Specifically, the terminal accommodating portions 25 are provided on one end face in the transverse direction of the fourth covering wall 24 and open in the thickness direction of the fourth covering wall 24. The terminal accommodating portions 25 are formed continuously with the second and third covering walls 22, 23, respectively.

Two quadrangular prism-shaped pillar members 26 are provided on an end face in the transverse direction of the fourth covering wall 24. Each pillar member 26 is adjacent to one of the terminal accommodating portions 25. The axes of the pillar member 26 extend in the transverse direction of the covering walls 22, 23. Each pillar member 26 has an insertion hole 26a, which extends through the pillar member 26 along the axis of the pillar member 26.

The second covering wall 22 and the third covering wall 23 each have a guide portion 27, which is provided continuously with the first longitudinal end portion 22a, 23a. The guide portions 27 extend in the longitudinal direction of the covering walls 22, 23. Quadrangular prism-shaped leg portions 28 are provided at the second longitudinal end portions 22c, 23c of the second covering wall 22 and the third covering wall 23, respectively. The axes of the leg portions 28 extend in the transverse direction of the covering walls 22, 23. Each leg portion 28 has an insertion hole 28a, which extends through the leg portion 28 along the axis of the leg portion 28.

Each heat transfer plate 41 is formed by bending a metal plate into an L-shape. The heat transfer plate 41 includes a rectangular flat plate-shaped main body 42 and a bend portion 43, which extends in the thickness direction of the main body 42 from one end in the longitudinal direction of the main body 42.

Figure 5:
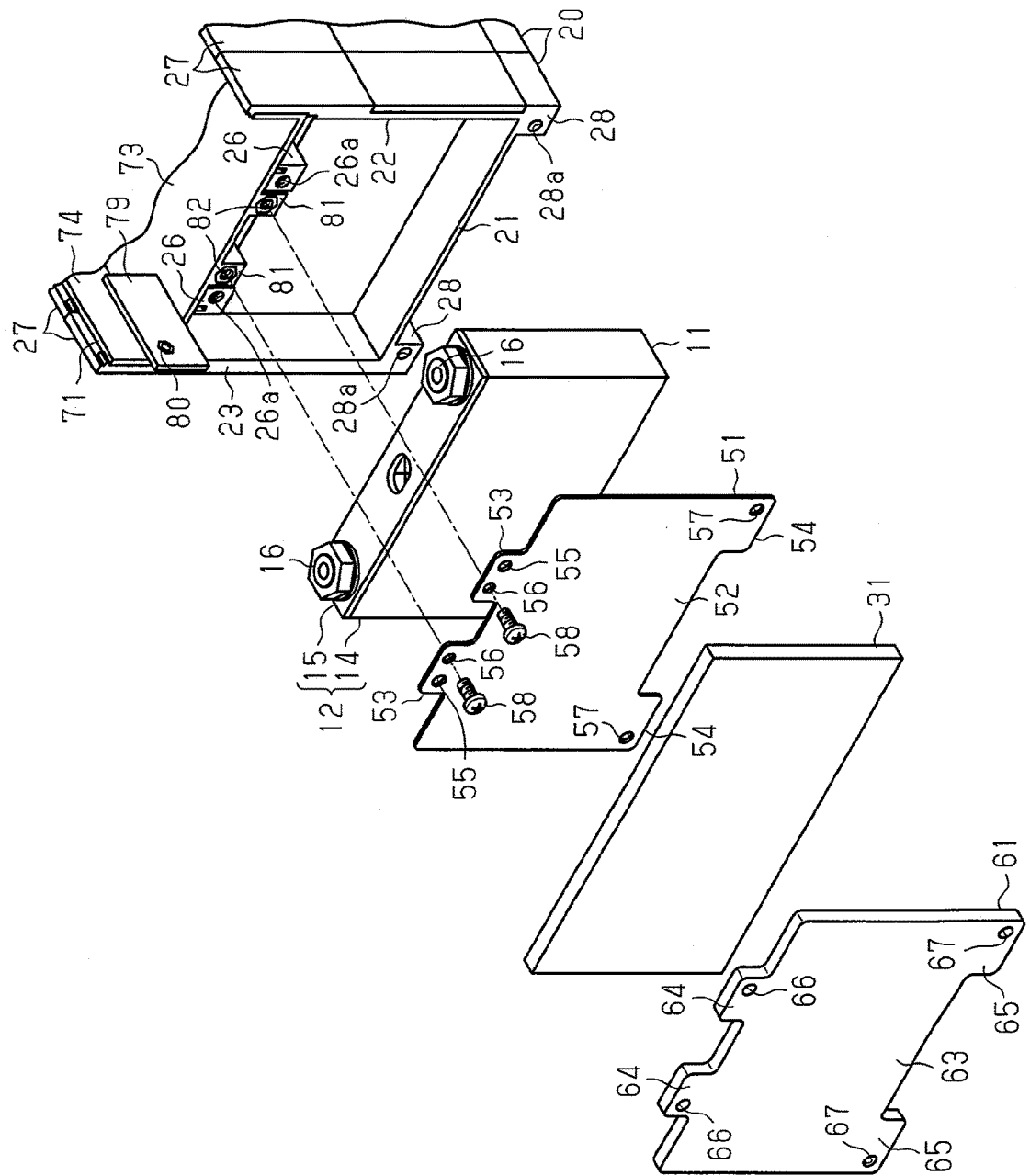
FIG. 5 is an exploded perspective view of the battery module.

As shown in FIG. 5, the attachment plate 51 has a rectangular flat plate-shaped base portion 52. The base portion 52 has projections 53, 54, which protrude in a direction along the plane in the thickness direction of the base portion 52. Specifically, two first projections 53 are provided at one of the ends in the transverse direction of the base portion 52, and two second projections 54 are provided at the other end.

The first projections 53 are provided near the center of the end in the transverse direction and at a distance from each other in the longitudinal direction of the base portion 52. Each first projection 53 has a first through-hole 55 and a second through-hole 56, which extend through the first projection 53 in the thickness direction. The distance between the first through-holes 55 is equal to the distance between the insertion holes 26a of the pillar members 26 of the battery holder 20.

The second projections 54 are provided at the opposite ends in the longitudinal direction of the base portion 52. Each second projection 54 has a third through-hole 57. The distance between the third through-holes 57 is equal to the distance between the insertion holes 28a of the leg portions 28 of the battery holder 20.

The first end plate 61 has a rectangular and flat plate base portion 63. The plate base portion 63 has two first plate projections 64 and two second plate projections 65, which extend from the opposite ends in the transverse direction of the plate base portion 63.

Each first plate projection 64 has a first plate through-hole 66, which extends through the first plate projection 64 in the thickness direction. The distance between the first plate through-holes 66 is equal to the distance between the insertion holes 26a of the pillar members 26 of the battery holder 20. Each second plate projection 65 has a second plate through-hole 67. The distance between the second plate through-holes 67 is equal to the distance between the insertion holes 28a of the leg portions 28 of the battery holder 20.

As shown in FIG. 4, the second end plate 62 has the same shape as the first end plate 61. Thus, the same reference numerals are given to the same portions, and description thereof will be omitted. Each first plate projection 64 of the second end plate 62 has a third plate through-hole 68, which extends through the first plate projection 64 in the thickness direction.

As shown in FIG. 2, the battery cells 11, the heat transfer plates 41, the battery holders 20, the attachment plate 51, and the elastic body 31 are integrally held by the first end plate 61 and the second end plate 62. Bolts B are inserted through the through-holes 66 and 67 of the first end plate 61, the insertion holes 26a, 28a of the battery holder 20, the first through-holes 55 of the attachment plate 51, the third through-holes 57 of the attachment plate 51, and the plate through-holes 66, 67 of the second end plate 62. The bolts B are threaded to nuts N at positions outside the plate through-holes 66, 67 of the first end plate 61. This applies load to the first and second end plates 61, 62 in the approaching direction and thus restrains the components.

As shown in FIGS. 1 and 2, the battery module 10 includes a cover 70. The cover 70 faces the surfaces (lid members 15) of the cases 12 of the battery cells 11, on which the terminals 16 are provided. The cover 70 thus covers the surfaces of the cases 12 on which the terminals 16 are provided. The cover 70 is arranged between the guide portions 27 of the battery holders 20. The cover 70 has a first cover member 71 and a second cover member 72, which are arranged in the arrangement direction of the battery cells 11.

Figure 6:
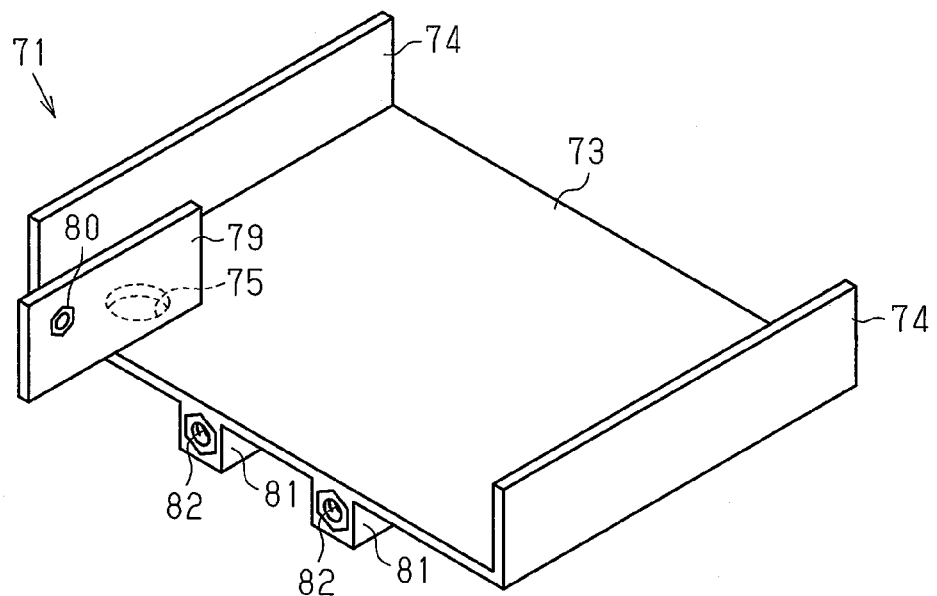
FIG. 6 is a perspective view of the first cover member.

As shown in FIG. 6, the first cover member 71 includes a rectangular flat plate-shaped main body 73. The first cover member 71 also includes upright portions 74, which are arranged at the opposite ends in the longitudinal direction of the main body 73 and project in the thickness direction of the main body 73. The main body 73 has a through-hole 75, which extends in the thickness direction. The through-hole 75 is located in the vicinity of a corner of the main body 73. A flat fixing plate 79 is provided on one of the surfaces of the main body 73 in the thickness direction on which the upright portions 74 are provided. The fixing plate 79 is located in the vicinity of the through-hole 75. A nut 80 is embedded in the fixing plate 79 by any appropriate method such as insert molding.

Two quadrangular prism-shaped fixing portions 81 are provided on one of the surfaces of the main body 73 in the thickness direction on the side opposite to the side on which the upright portions 74 are provided. The fixing portions 81 are provided at one of the opposite ends in the transverse direction. The fixing portions 81 are separated from each other in the longitudinal direction of the main body 73. The distance between the two fixing portions 81 is smaller than the distance between the two pillar members 26 of the battery holder 20. Specifically, the distance between the outer surfaces of the two fixing portions 81 is shorter than the distance between the inner surfaces of the pillar members 26 of the battery holder 20. Regarding the fixing portions 81 and the pillar members 26, the inner surfaces refer to the surfaces facing each other, and the outer surfaces refer to the surfaces on the opposite sides from the inner surfaces. A nut 82 is embedded in each fixing portions 81 by any appropriate method such as insert molding.

Figure 7:
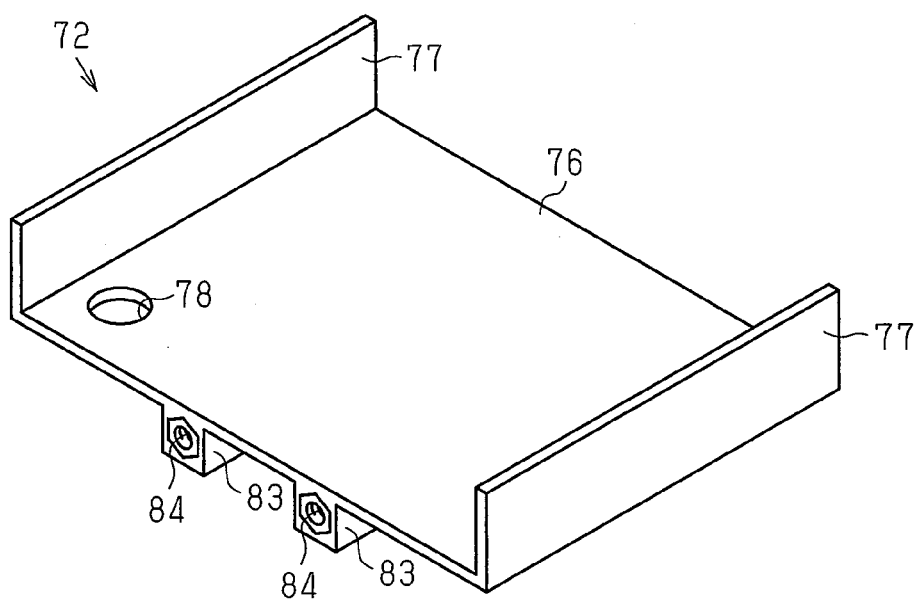
FIG. 7 is a perspective view of the second cover member.

As shown in FIG. 7, the second cover member 72 includes a rectangular flat plate-shaped main body 76. The second cover member 72 also includes upright portions 77, which are arranged at the opposite ends in the longitudinal direction of the main body 76 and project in the thickness direction of the main body 76. The main body 76 has a through-hole 78, which extends in the thickness direction. The through-hole 78 is located in the vicinity of a corner of the main body 76.

Two quadrangular prism-shaped fixing portions 83 are provided on one of the surfaces of the main body 76 in the thickness direction on the side opposite to the side on which the upright portions 77 are provided. The fixing portions 83 are provided at one of the opposite ends in the transverse direction. The fixing portions 83 are separated from each other in the longitudinal direction of the main body 76. A nut 84 is embedded in each fixing portions 83 by any appropriate method such as insert molding. The distance between the nuts 84, which are embedded in the fixing portions 83, (the distance between the centers of the nuts 84) is equal to the distance between the third plate through-holes 68 of the second end plate 62.

As shown in FIG. 1, the first cover member 71 and the second cover member 72 are arranged such that the corners at which the through holes 75, 78 are positioned to be diagonal from each other. The first cover member 71 is located closer to the first end plate 61, and the second cover member 72 is located closer to the second end plate 62. The upright portions 74 of the first cover member 71 and the upright portions 77 of the second cover member 72 are each arranged along the guide portions 27 of the corresponding battery holders 20. Since the first cover member 71 and the second cover member 72 are not fixed to each other, they can be separated from each other in the arrangement direction of the battery cells 11, that is, are relatively movable.

As shown in FIGS. 1 and 2, a screw 59 is inserted into each third plate through-hole 68 of the second end plate 62 and is threaded to the nut 84 embedded in the corresponding fixing portion 83 of the second cover member 72. This fixes the second end plate 62 to the second cover member 72.

As shown in FIG. 5, the fixing portions 81 of the first cover member 71 are located between the pillar members 26 of the corresponding battery holder 20. The screws 58 inserted into the second through-holes 56 of the attachment plate 51 are threaded to the nuts 82 embedded in the fixing portions 81, so that the attachment plate 51 is fixed to the first cover member 71.

As shown in FIG. 1, a columnar bus bar 100 is inserted in the through-hole 75 of the first cover member 71. The bus bar 100 includes a first columnar portion 101 and a second columnar portion 102, which is perpendicular to the first columnar portion 101. The first columnar portion 101 is connected to the terminal 16 of the first battery cell 11a and extends through the through-hole 75 of the first cover member 71 to protrude upward from the cover 70. The second columnar portion 102 extends along the fixing plate 79. A harness 104 is fixed to the second columnar portion 102 with a screw 103. The screw 103 extends through a connector portion 105 of the harness 104 and the second columnar portion 102 and is threaded to the nut 80 embedded in the fixing plate 79. This fixes the harness 104, together with the bus bar 100, to the first cover member 71.

A monitoring ECU 85a, which is a first electronic component, is placed on the first cover member 71. The monitoring ECU 85a monitors the battery module 10. When an anomaly occurs in the battery module 10 (or in any of the battery cells 11), the monitoring ECU 85a, for example, stops electric discharge from the battery module 10. A current sensor 85b, which is a second electronic component, is fixed to the second cover member 72. The current sensor 85b is connected to the battery cells 11. Specifically, the second battery cell 11b has a columnar bus bar 86 on the terminal 16. The bus bar 86 extends through the through-hole 78 of the second cover member 72 and is connected to a connecting terminal (not shown) of the current sensor 85b.

The monitoring ECU 85a and the current sensor 85b are electrically connected to each other by a cable 95. The cover 70 has first to fourth support portions 96, 97, 98, 99, which support the cable 95. The cover 70 has a first end portion 701 in a direction perpendicular to the arrangement direction of the battery cells 11, and a second end portion 702, which is located on the opposite side from the first end portion 701. The first to fourth support portions 96, 97, 98, 99 are arranged in a section on an upper surface 70a of the cover 70 that is closer to the first end portion 701. Being closer to the first end portion 701 refers to a state in which, regarding the positional relationship among the support portions 96, 97, 98, 99, the first end portion 701, and the second end portion 702, the support portions 96, 97, 98, 99 are closer to the first end portion 701 than to the second end portion 702.

The monitoring ECU 85a is located at the center portion in the direction perpendicular to the arrangement direction of the battery cells 11 on the upper surface 70a of the cover 70 and closer to the first end plate 61. Being closer to the first end plate 61 refers to a state in which, regarding the positional relationship among the monitoring ECU 85a and the end plates 61, 62, the monitoring ECU 85a is closer to the first end plate 61 than to the second end plate 62. The current sensor 85b is located closer to the second end portion 702 on the upper surface 70a of the cover 70 and closer to the second end plate 62. Being closer to the second end plate 62 refers to a state in which, regarding the positional relationship among the current sensor 85b and the end plates 61, 62, the current sensor 85b is closer to the second end plate 62 than to the first end plate 61.

The first to fourth support portions 96, 97, 98, 99 are shaped as L-shaped hooks. The first to fourth support portions 96, 97, 98, 99 respectively include upright portions 96a, 97a, 98a, 99a, which project upward from the upper surface 70a of the cover 70, and extensions 96b, 97b, 98b, 99b, which extend from the distal ends of the upright portions 96a, 97a, 98a, 99a to be parallel with the upper surface 70a of the cover 70.

The first support portion 96 and the second support portion 97 are arranged to be offset from each other in a direction intersecting with the arrangement direction of the battery cells 11. The first support portion 96 is arranged to be closer to the first end portion 701 than the second support portion 97. The third support portion 98 is located on the opposite side of the first support portion 96 from the second support portion 97 and arranged to be adjacent to the first support portion 96 in the arrangement direction of the battery cells 11. The fourth support portion 99 is located on the opposite side of the second support portion 97 from the first support portion 96 and arranged to be adjacent to the second support portion 97 in the arrangement direction of the battery cells 11. The first support portion 96 and the third support portion 98 are provided on the first cover member 71, and the second support portion 97 and the fourth support portion 99 are provided on the second cover member 72.

Figure 8:
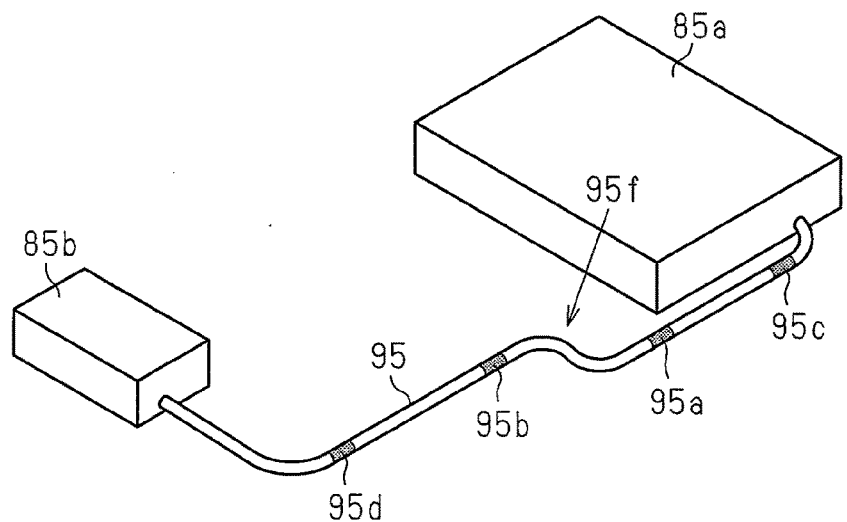
FIG. 8 is a perspective view of a monitoring ECU, a current sensor, and a cable.

As shown in FIG. 8, the cable 95 has first to fourth aid portions 95a, 95b, 95c, 95d, which clearly indicate sections to be supported by the first to fourth support portions 96, 97, 98, 99, thereby aiding in the routing of the cable 95. The colors of the first to fourth aid portions 95a, 95b, 95c, 95d are different from that of the remaining parts of the cable 95.

As shown in FIG. 1, the cable 95 is supported by the first to fourth support portions 96, 97, 98, 99 at positions clearly indicated by the first to fourth aid portions 95a, 95b, 95c, 95d. Specifically, the first support portion 96 supports the cable 95 at the position clearly indicated by the first aid portion 95a, and the second support portion 97 supports the cable 95 at the position clearly indicated by the second aid portion 95b. Further, the third support portion 98 supports the cable 95 at the position clearly indicated by the third aid portion 95c, and the fourth support portion 99 supports the cable 95 at the position clearly indicated by the fourth aid portion 95d.

The cable 95 extends from the monitoring ECU 85a toward the third support portion 98, extends from the third support portion 98 toward the first support portion 96, and extends from the first support portion 96 toward the second support portion 97. Subsequently, the cable 95 extends from the second support portion 97 toward the fourth support portion 99, and extends from the fourth support portion 99 toward the current sensor 85b.

Specifically, the cable 95 extends in the arrangement direction of the battery cells 11 between the first support portion 96 and the third support portion 98, and extends in a direction intersecting with the arrangement direction of the battery cells 11 between the first support portion 96 and the second support portion 97. Further, the cable 95 is routed to extend in the arrangement direction of the battery cells 11 between the second support portion 97 and the fourth support portion 99. The cable 95 has a bent portion 95f, which is capable of being deformed in accordance with relative movement between the first cover member 71 and the second cover member 72 in the arrangement direction of the battery cells 11. The bent portion 95f is provided between the first support portion 96 and the second support portion 97. The cable 95 is supported by the first to fourth support portions 96, 97, 98, 99, so that the shape of the bent portion 95f is maintained.

The cable 95 is routed to be located on the sides of the first, third, and fourth support portions 96, 98, 99 closer to the first end portion 701 than the corresponding upright portions 96a, 98a, 99a. Further, the cable 95 is routed to be located on the side of the second support portion 97 closer to the second end portion 702 than the upright portion 97a. Therefore, the parts of the upright portions 96a, 98a, 99a of the first, third, and fourth support portions 96, 98, 99 that face the first end portion 701 are opposed to the cable 95. The part of the upright portion 97a of the second support portion 97 that faces the second end portion 702 is opposed to the cable 95.

Figure 9:
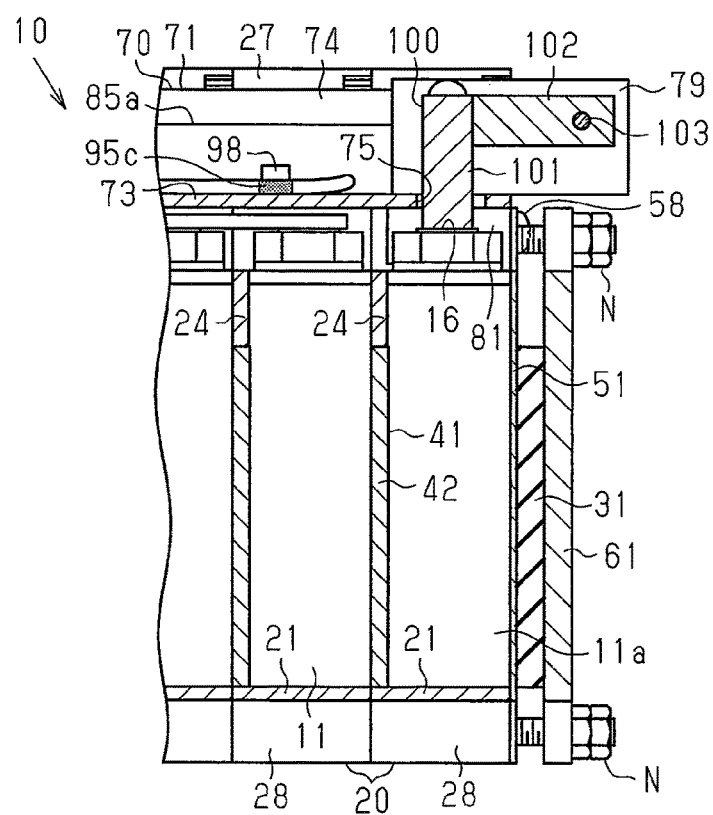
FIG. 9 is a partial cross-sectional view of the battery module before the elastic member is elastically deformed.
Figure 10:
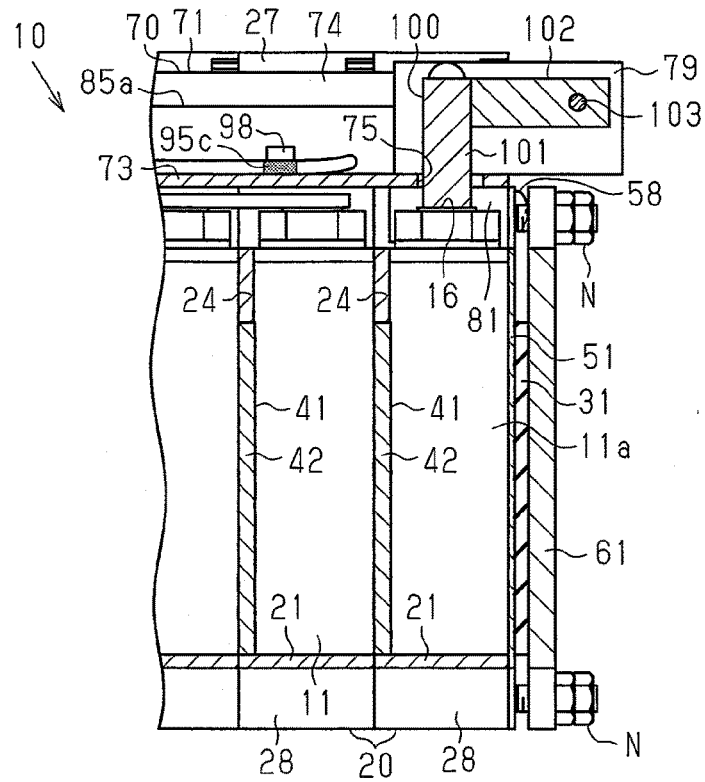
FIG. 10 is a partial cross-sectional view of the battery module when the elastic member is elastically deformed.

FIG. 9 shows a state before the elastic body 31 is elastically deformed, and FIG. 10 shows a state in which the elastic body 31 is elastically deformed. The battery cells 11 expand through repetitive use. Specifically, repetitive charging and discharging of the battery cells 11 causes films to form on the surfaces of the positive electrodes 13a and the negative electrodes 13b. As the films thicken, the electrode assemblies 13 expand in the lamination direction. With the expansion of the electrode assemblies 13 in the lamination direction, the side walls located in the lamination direction of the electrode assemblies 13 in the cases 12 are pressed, which deforms the cases 12. As the battery cells 11 expand in this manner, the elastic body 31 is elastically deformed in accordance with the expansion of the battery cells 11. Thus, even if the cases 12 are deformed, the first end plate 61 and the second end plate 62 are restricted from receiving load.

When the elastic body 31 is elastically deformed as shown in FIG. 10, the attachment plate 51, to which the first cover member 71 is attached, moves integrally with the first cover member 71. Therefore, the bus bar 100, the first cover member 71, and the attachment plate 51 move integrally in the arrangement direction of the battery cells 11, so that the bus bar 100 is restricted from receiving stress between the battery cells 11 and the first cover member 71. When the first cover member 71 moves, the upright portions 74 are moved along the guide portions 27 of the battery holders 20, so that the first cover member 71 is guided in the arrangement direction of the battery cells 11.

Operation of the present embodiment will now be described with reference to FIG. 11. For purposes of illustration, the battery holders 20 are omitted in FIG. 11.

Figure 11:
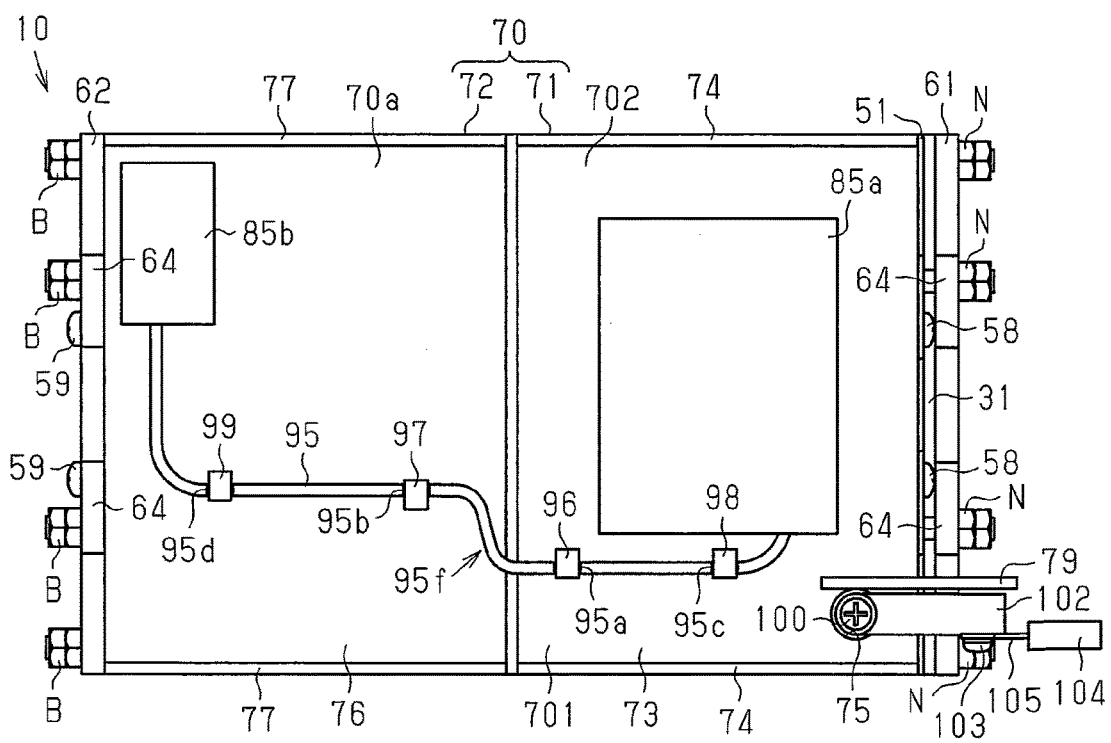
FIG. 11 is a top view of the battery module in a state in which the first cover member has been moved away from the second cover member.

As shown in FIG. 11, the cable 95 is supported by the first to fourth support portions 96, 97, 98, 99 with a bent portion 95f provided in a part. Thus, compared to the case in which the cable 95 does not have the bent portion 95f, the cable 95 is restricted from being taut between the monitoring ECU 85a and the current sensor 85b when the first cover member 71 moves away from the second cover member 72. Also, the cable 95 is supported by the first to fourth support portions 96, 97, 98, 99, such that the shape of the bent portion 95f is maintained. Thus, as compared to the case in which the cable 95 is not supported by the first to fourth support portions 96, 97, 98, 99, the cable 95 is restricted from flapping on the cover 70. Therefore, the cable 95 is restricted from being broken by being taut or flapping.

The bent portion 95f is provided between the first support portion 96 and the second support portion 97. For example, when the first cover member 71 moves away from the second cover member 72, frictional force is generated between the cable 95 and the first to fourth support portions 96, 97, 98, 99, so that the cable 95 may be unable to slide on the first to fourth support portions 96, 97, 98, 99 in some cases. Even in this case, the cable 95 is restricted from being taut between the monitoring ECU 85a and the current sensor 85b.

The above described embodiment achieves the following advantages.

(1) The cable 95 has the bent portion 95f, which can be deformed in accordance with relative movement between the first cover member 71 and the second cover member 72 in the arrangement direction of the battery cells 11. The cover 70 has the first to fourth support portions 96, 97, 98, 99, which support the cable 95 such that the shape of the bent portion 95f is maintained. With this configuration, as compared to the case in which the cable 95 does not have the bent portion 95f, the cable 95 is restricted from being taut between the monitoring ECU 85a and the current sensor 85b when the first cover member 71 and the second cover member 72 move relative to each other in the arrangement direction of the battery cells 11 as the battery cells 11 expand. Also, as compared to the case in which the cable 95 is not supported by the first to fourth support portions 96, 97, 98, 99, the cable 95 is restricted from flapping on the cover 70. Therefore, the cable 95 is restricted from being broken by being taut or flapping.

(2) The bent portion 95f is provided between the first support portion 96 and the second support portion 97. This facilitates the formation of the bent portion 95f and routing of the cable 95.

(3) The first support portion 96 is provided on the first cover member 71, and the second support portion 97 is provided on the second cover member 72. For example, when the first cover member 71 moves away from the second cover member 72, frictional force is generated between the cable 95 and the first to fourth support portions 96, 97, 98, 99, so that the cable 95 may be unable to slide on the first to fourth support portions 96, 97, 98, 99 in some cases. Even in this case, the cable 95 is restricted from being taut between the monitoring ECU 85a and the current sensor 85b.

(4) The cable 95 is routed to be located on the side of the first support portion 96 closer to the first end portion 701 than the upright portion 96a. Further, the cable 95 is routed to be located on the side of the second support portion 97 closer to the second end portion 702 than the upright portion 97a. With this configuration, even if the cable 95 is moved toward either the first end portion 701 or the second end portion 702, the cable 95 is unlikely to be disengaged from the first support portion 96 and the second support portion 97. Therefore, the cable 95 is more effectively restricted from flapping on the cover 70.

(5) The cable 95 extends in the arrangement direction of the battery cells 11 between the first support portion 96 and the third support portion 98. Also, the cable 95 extends in the arrangement direction of the battery cells 11 between the first support portion 96 and the second support portion 97. Further, the cable 95 is routed to extend in the arrangement direction of the battery cells 11 between the second support portion 97 and the fourth support portion 99. The bent portion 95*f* is provided between the first support portion 96 and the second support portion 97, which are offset from each other in a direction intersecting with the arrangement direction of the battery cells 11. Therefore, for example, as compared to the case in which a bent portion is provided between the first support portion 96 and the third support portion 98 or between the second support portion 97 and the fourth support portion 99, the bent portion 95*f* can be provided while minimizing flapping of the cable 95.

(6) The first to fourth aid portions 95*a*, 95*b*, 95*c*, 95*d* aid in the routing of the cable 95 such that the bent portion 95*f* is provided in the cable 95 when the cable 95 is supported by the first to fourth support portions 96, 97, 98, 99. This facilitates the routing of the cable 95.

(7) The first to fourth aid portions 95*a*, 95*b*, 95*c*, 95*d* are provided on the cable 95 and clearly indicate the positions to be supported by the first to fourth support portions 96, 97, 98, 99. With this configuration, the bent portion 95*f* is provided in the cable 95 simply by supporting the cable 95 with the support portions 96, 97, 98, 99 at the positions clearly indicated by the first to fourth aid portions 95*a*, 95*b*, 95*c*, 95*d*. This facilitates the routing of the cable 95.

(8) In the present embodiment, while the elastic body 31 is provided between the first end plate 61 and the first battery cell 11*a*, the elastic body 31 is not provided between the second end plate 62 and the second battery cell 11*b*. Thus, when the cases 12 of the battery cells 11 are deformed so that the battery cells 11 are moved slightly, the battery cells 11 are moved toward the elastic body 31, that is, toward the first end plate 61. Thus, the first battery cell 11*a* is moved by a greater amount than the second battery cell 11*b*. Since the first cover member 71 and the second cover member 72 are not fixed to each other, only the first cover member 71 acts to move integrally with the first battery cell 11*a* as the first battery cell 11*a* moves. That is, providing the elastic body 31 only between the first end plate 61 and the first battery cell 11*a* determines the moving direction of the battery cells 11 and allows the first cover member 71 and the second cover member 72 to be separated from each other. This reduces the influence on the second cover member 72.

The above illustrated embodiment may be modified as follows.

Figure 12:
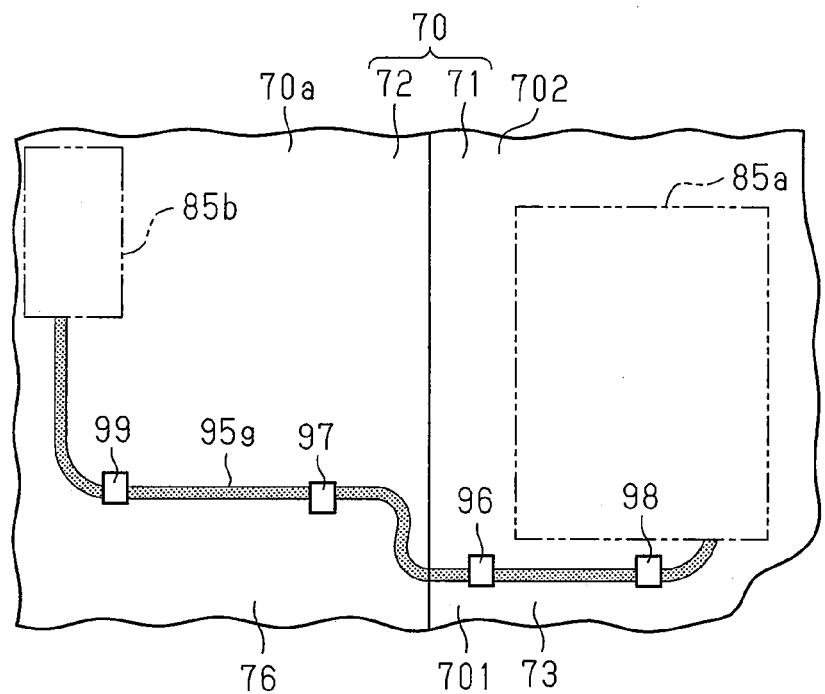
FIG. 12 is a partial top view of a first cover member and a second cover member according to another embodiment.

As shown in FIG. 12, an aid portion 95*g* may be provided on the upper surface 70*a* of the cover 70 to clearly indicate the routing path of the cable 95. The aid portion 95*g* clearly indicates the routing path of the cable 95, for example, by applying a color to the upper surface 70*a* of the cover 70. With this configuration, since the bent portion 95*f* is provided in the cable 95 simply by routing the cable 95 along the routing path of the cable 95 clearly indicated by the aid portion 95*g*, the routing of the cable 95 is facilitated.

In the above illustrated embodiment, indices such as letters or patterns may be provided on the cable 95 as the first to fourth aid portions 95*a*, 95*b*, 95*c*, 95*d*.

In the above illustrated embodiment, the first to fourth aid portions 95*a*, 95*b*, 95*c*, 95*d* may be omitted from the cable 95.

In the above illustrated embodiment, the number of the cover members may be increased.

In the above illustrated embodiment, the number of the support portions may be increased.

In the above illustrated embodiment, the positions of the support portions may be changed as necessary.

In the above illustrated embodiment, the position of the bent portion 95*f* may be changed as necessary.

In the above illustrated embodiment, the shape of the support portions is not particularly limited.

In the above illustrated embodiment, as long as the bus bar 100 is fixed to any position of the cover 70, the bus bar 100 does not necessarily need to be fixed to the fixing plate 79. If the bus bar 100 is not fixed to the fixing plate 79, the fixing plate 79 may be omitted.

In the above illustrated embodiment, in addition to the one between the first end plate 61 and the first battery cell 11*a*, an additional elastic body may be provided between the second end plate 62 and the second battery cell 11*b*. Also, an additional attachment plate may be provided that is attached to the second cover member 72 and sandwiched between the additional elastic body and the second battery cell 11*b*.

In the above illustrated embodiment, the attachment plate 51 may be attached to the cover 70 by means other than the screws 58, for example, by adhesive.

In the above illustrated embodiment, the cable 95 is not limited to the one that electrically connects the monitoring ECU 85*a* and the current sensor 85*b*, but may be any cable as long as it electrically connects a first electronic component fixed to the first cover member 71 and a second electronic component fixed to the second cover member 72.

In the above illustrated embodiment, the electrode assembly 13 may be a spiral type in which a belt-shaped positive electrode and a belt-shaped negative electrode are wound together to form a lamination.

The invention claimed is:

1. A battery module comprising:
    a plurality of battery cells arranged side by side, each battery cell having a terminal;
    two end plates that sandwich the battery cells from opposite sides in an arrangement direction of the battery cells;
    an elastic body that is sandwiched between one of the two end plates and one of the battery cells, the elastic body being elastically deformed as the battery cells expand;
    a cover that faces surfaces of the battery cells on which the terminals are provided and includes a first cover member and a second cover member, which are arranged in the arrangement direction of the battery cells and moveable relative to each other in the arrangement direction as the battery cells expand;
    a first electronic component fixed to the first cover member;
    a second electronic component fixed to the second cover member; and
    a cable that electrically connects the first electronic component and the second electronic component to each other, wherein
    the cable includes a bent portion that is capable of being deformed in accordance with relative movement between the first cover member and the second cover member in the arrangement direction, and
    the cover includes a plurality of support portions that supports the cable to maintain a shape of the bent portion.

2. The battery module according to claim 1, wherein
    the support portions include a first support portion and a second support portion that are arranged to be offset from each other in a direction intersecting with the arrangement direction, and the bent portion is located between the first support portion and the second support portion.

3. The battery module according to claim 2, wherein
the first support portion is provided on the first cover member, and
the second support portion is provided on the second cover member.

4. The battery module according to claim 2, wherein
the first support portion and the second support portion each include an upright portion that projects upward from an upper surface of the cover,
the cover includes a first end portion in a direction perpendicular to the arrangement direction of the battery cells, and a second end portion, which is located on an opposite side from the first end portion,
the cable is routed to be located on a side of the first support portion closer to the first end portion than the upright portion of the first support portion, and
the cable is routed to be located on a side of the second support portion closer to the second end portion than the upright portion of the second support portion.

5. The battery module according to claim 2, wherein the support portions include a third support portion that is located on an opposite side of the first support portion from the second support portion in the arrangement direction and is arranged to be adjacent to the first support portion in the arrangement direction, and
a fourth support portion that is located on an opposite side of the second support portion from the first support portion in the arrangement direction and is arranged to be adjacent to the second support portion in the arrangement direction.

6. The battery module according to claim 1, further comprising an aid portion that aids in routing of the cable such that the bent portion is provided in the cable when the cable is supported by the support portions.

7. The battery module according to claim 6, wherein the aid portion is provided on the cable and clearly indicates positions to be supported by the support portions.

8. The battery module according to claim 6, wherein the aid portion is provided on the cover and clearly indicates a routing path of the cable.

* * * * *